Patented Oct. 3, 1939

2,174,770

UNITED STATES PATENT OFFICE 2,174,770

THERMAL INSULATING COMPOSITION

William S. Wilson, Brookline, Mass., assignor, by mesne assignments, to Monsanto Chemical Company, a corporation of Delaware No Drawing. Application January 18, 1936, Serial No. 59,795

17 Claims. (Cl. 106—18)

The present invention relates to heat insulating materials and it has particular relation to the provision of heat insulating materials which are highly efficient over a broad range of temperatures.

The principal object of the invention is to provide heat insulating materials which are adapted for use over a wide range of temperatures and which possess, to an outstanding degree, the property of a uniformly low heat conductivity coefficient. Temperatures at which the improved insulating materials may be used extend well above the temperatures at which known organic insulating materials would decompose, and may be used advantageously in cases where the temperature differential is several hundred degrees F.

The rapid growth of artificial refrigeration, processes of conditioning air in public and private buildings and in various types of conveyances as well as in allied arts, has led to an intensive search for purposes of developing better heat insulating materials. Most of the materials heretofore employed have depended primarily for heat insulation powers upon the provision of a body containing a large number of interstices or cells filled with a non-conductive gas such as air.

For ordinary temperatures and where the temperature differential is only a comparatively few degrees, such as is met with in ordinary household refrigerators, insulations of cellulosic structure are satisfactory. However, their use is limited to ordinary or subnormal temperatures.

Because of the fact that inorganic aerogels can withstand elevated temperatures without damage, it could be assumed that the aerogels, such as silica aerogels or alumina aerogels, etc., could be used for high temperature insulation purposes, especially where the temperature differential is comparatively large. It has been found, however, as the temperature differential increases and as the mean temperature rises above 100° C., the thermal conductivity coefficient of inorganic aerogels increases rapidly. In other words, the efficiency of the aerogels as insulators decreases.

This invention is based on the discovery that metallic silicon or alloys thereof, have the property of stabilizing or maintaining a low, thermal conductivity of aerogels and known insulating materials, so that the improved insulating material may be used successfully where a relatively large temperature differential is involved, and especially where the temperature on the high side is well above the ordinary temperatures. The silicon may be mixed uniformly in pulverulent form with the insulating material or may be used in a flake or foil form. While silicon is especially suited for use with the more efficient insulating materials, such as aerogels, it may be used to advantage even in the case of ceramic, vermiculite and mineral wool type insulating materials.

Since the silicon is non-porous and is of high heat conductivity, it cannot be assumed that it improves the material by increasing the volume of dead air. Furthermore, it is a good conductor of heat and cannot reduce heat loss by directly decreasing heat conductivity through the solid phase. Finally, silicon is described in the prior literature as having poor powers of reflection.

Silicon may be used to improve the insulating power of various materials such as asbestos, vermiculite, glass wool and rock wool; it is especially useful in connection with the extremely porous gels known as aerogels. The latter may be obtained by expelling the liquid medium from an ordinary gel by heating it in an autoclave to a temperature approximating or preferably above the critical temperature for the particular liquid, and then allowing the vapors to escape without reformation of a liquid phase. They are described in detail in articles by S. S. Kistler, Journal of Industrial and Engineering Chemistry, 1934, page 658.

Silicon in pulverulent form may be admixed with a pulverulent granular, fibrous or other form of insulating material. This method is especially applicable to the treatment of granular or pulverulent aerogels.

While the physical mixture of the pulverulent, metallic silicon and the aerogel, or other inorganic insulating material, affords a convenient improved insulating composition and may be used as a loose powder (preferably under conditions which avoid exposure to moisture when an aerogel is employed), the mixture may be compressed, moulded or otherwise formed into sheets, slabs, bricks, or other structural forms known to those skilled in this art. It is likewise to be noted that the silicon can be used as a flake, scale, foil or sheet with which the mineral insulator is associated.

A clean surface of silicon metal presents a distinct metallic lustre. However, upon exposure to the atmosphere the surface becomes darkened, probably with the formation of a suboxide, due to some reaction with the elements. This results in darkening of the surface and is particularly noticeable in the case of the finely ground, pulverulent silicon. I have found, however, that for my purpose the effectiveness of the silicon is not thereby impaired.

The invention is not limited to the use of pure silicon. Powdered alloys of silicon such as ferrosilicon may also be used and these are usually less expensive than silicon in elemental form.

An aerogel to which silicon may be added is formed, for example, by treating a dilute solution of water glass with sufficient acid such as sulfuric acid to form a gel which is then washed with water in order to remove soluble salts. The water in the gel is then replaced by washing with alcohol or other non-solvent liquid and the mass is heated in an autoclave to a temperature at or above critical for the liquid. The vapors are then allowed to escape while the temperature is maintained above the condensation point.

The product from the autoclave still retains its essential gel form, has a specific gravity as low as .1, or even lower, and consists of a silica. The voids or cells are filled with air and are so small as to be sub-microscopic. Finely pulverized silicon, preferably under 200 mesh, is mixed with the crushed aerogel by simply agitating the two together for a short time. The silicon is found to exert a beneficial action when used over a relatively wide range of proportions with the mineral insulator. Good results have been obtained with proportions by weight ranging from about 7.5 to 30 per cent; under some conditions as little as 2 or 3 per cent may be used.

The conductivity of the material was determined by standard calorimetric methods and was expressed as B. t. u.'s per hour, per degree F. temperature differential, through a layer of material 1 foot square and 1 inch thick. The results of these tests for various mean temperatures are tabulated as follows:

| Temp. ° F. | Aerogel | Silica aerogel+7½% Si | Silica aerogel+15% Si | Silica aerogel+30% Si |
|---|---|---|---|---|
| 200 | .22 | .11 | .11 | .10 |
| 300 | .42 | .22 | .17 | .18 |
| 400 | .65 | .33 | .23 | .25 |
| 500 | .92 | .44 | .28 | .30 |
| 525 | 1.01 | .47 | .315 | .31 |

The foregoing table is illustrative of the improved results obtainable when an inorganic or mineral heat insulator is used in association with silicon or silicon coated with a suboxide. Inasmuch as silicon is relatively inexpensive and is capable of withstanding high temperatures while at the same time improving greatly the efficiency of the mineral insulating material, the combination disclosed herein affords a substantial advance over the present art of heat insulation.

It is to be understood that while the advantages afforded by the present invention are set forth numerically only as to aerogels that the principles of the invention are not so limited but extend to many embodiments as hereinabove set forth without departing from the spirit of my invention.

Thus, whether the silicon is mixed with pulverulent aerogel or is formed into structural shapes in admixture with vermiculite and a binder, or is compounded with asbestos fibres, rock wool, magnesia and the like, or whether the aerogel is encased in silicon foil, or alloys consisting predominantly of silicon, especially those which are malleable, falls within the purview of my invention.

What I claim is:

1. A non-heat-conductive inorganic insulating material embodying elemental silicon as a component part thereof.

2. A heat insulating material comprising a non-heat conductive but partially transparent inorganic material admixed with silicon.

3. A heat insulating material comprising a non-heat conductive inorganic material admixed with finely divided silicon.

4. A heat insulating material comprising a fibrous partially transparent inorganic material admixed with finely divided silicon.

5. An inorganic heat insulating material comprising a partially transparent solid material expanded to form a mass of low density and with many small dead air spaces, said material containing finely divided silicon admixed therewith.

6. An insulating material comprising a non-heat-conductive inorganic material admixed with a substantial amount of ferrosilicon.

7. An insulator as defined in claim 1 and further characterized in that the silicon is of a form defined by one of the following: powder, flake, foil, and sheet.

8. The method of producing an improved thermal insulator characterized in that an inorganic thermal insulating material is brought into cooperative relation with elemental silicon whereby the resulting elements are of reduced thermal conductivity.

9. Silica aerogel admixed with finely divided elemental silicon.

10. A heat insulator as defined in claim 3, and further characterized in that it includes mineral wool.

11. A heat insulator as defined in claim 3, and further characterized in that it includes asbestos.

12. A method as defined in claim 8, and further characterized in that the silicon is coated with sub-oxide.

13. An insulator as defined in claim 3 and further characterized in that the silicon is coated with sub-oxide.

14. An insulating material comprising a partially transparent inorganic aerogel in granular form admixed with finely divided silicon.

15. A granulated inorganic aerogel admixed with pulverulent silicon.

16. A porous partially transparent inorganic aerogel having fine particles of silicon embedded therein.

17. An insulator as defined in claim 5 and further characterized in that the silicon is coated with sub-oxide.

WILLIAM S. WILSON.